455/3

United States Patent [19]

Roach

[11] 3,924,190

[45] Dec. 2, 1975

[54] METHOD AND APPARATUS FOR AUTOMATIC PROGRAM CONTROL FOR CATV CHANNELS

[75] Inventor: William E. Roach, Banning, Calif.

[73] Assignee: Storer Broadcasting Company, Miami Beach, Fla.

[22] Filed: Jan. 6, 1975

[21] Appl. No.: 539,020

[52] U.S. Cl. ........... 325/395; 178/DIG. 13; 325/57; 325/308

[51] Int. Cl.[2] ....................... H04H 1/04; H04N 7/10

[58] Field of Search ...... 178/6.8, DIG. 13; 325/308, 325/395, 57

[56] References Cited

UNITED STATES PATENTS 3,686,573 8/1972 McVoy .............................. 325/395

*Primary Examiner*—Howard W. Britton
*Attorney, Agent, or Firm*—Gardiner, Sixbey, Bradford & Carlson

[57] ABSTRACT

A method and apparatus is provided to protect a CATV system against program duplication on plural channels when two or more broadcasting stations with the same program source are received. Synchronizing pulses are taken from the base band video signal from each station, and the signals from a selected station or stations are delayed to achieve time coincidence with the signals from the remaining station. The exact frequency and relative timing of the synchronizing pulses from the stations are sensed after the delay, and if coincidence occurs indicating that a unique precise phase or time differential is present, a switching system is activated to connect only one program source to a CATV cable or other receiving network.

19 Claims, 7 Drawing Figures

METHOD AND APPARATUS FOR AUTOMATIC PROGRAM CONTROL FOR CATV CHANNELS

BACKGROUND OF THE INVENTION

Many television systems, such as CATV systems, receive television programs from a plurality of broadcast stations or similar sources and transmit the receive television signals over different frequency channels to a common cable. Television receivers connected to the cable may be operated in the conventional manner to select a desired channel and to display the television program carried thereby. Since two broadcast stations received by a single CATV system may be affiliated with the same central broadcasting network, it is possible for the CATV system to receive the same network program from these two broadcasting stations on different channels. Government regulations require that should this dual programming occur, a priority channel be designated to carry the network program and that the program be deleted from the remaining nonpriority channel.

In the past, CATV systems have employed programmed clock controlled switching systems to delete dual channel network programs. These switching systems were preprogrammed over a period of time in accordance with projected network program scheduling to switch off the nonpriority channel when both this channel and the priority channel were scheduled to receive the same network program. Unfortunately, slight timing malfunctions in the clock control for such switching systems results in confused programming on the CATV channels for the preset controlled time period. Also, unscheduled changes in network or broadcast station programming are not taken into account by such preset clock controlled systems. Thus if the priority and nonpriority channels were originally scheduled to receive different programs, the clock controlled system would be preset to permit both channels to provide programming. Subsequently, if the broadcast station serving one channel cancelled a local program in favor of a network program which was simultaneously being carried by another station serving the CATV system, two channels in the system would be permitted to carry the same network program in violation of government regulations.

In an attempt to remedy the deficiencies of programmed clock controlled switching systems, automatic control systems responsive to the audio signals from two broadcast stations have been developed. One such known automatic control system is disclosed by U.S. Pat. No. 3,497,612 to Louis J. Bone. This system, and similar systems using the transmitted video rather than audio signals, rectify a narrow range of the audio or video signal for two TV channels and then compare the rectified signals to determine if both channels are receiving the same program. If the programs are the same, switching unit is activated to remove the program signal from one of the two channels.

The prior automatic control systems require that the actual audio or video signals from two broadcast stations be processed and compared, thereby giving rise to the likelihood of interference with such signals by the control system. Also, it is difficult to accurately compare the relatively complex audio and video signals, for the timing and amplitude of such signals may drift and vary. The prior control systems include no provision for the time delay occurring between signals from the two broadcast stations, and therefore timing inaccuracies make accurate comparisons difficult to achieve.

It is a primary object of the present invention to provide a novel method for controlling the provision of television signals to a receiving system when two broadcasting stations serving the receiving system are transmitting the same program.

Another object of the present invention is to provide a novel method for controlling the provision of television signals to a receiving system in response to the occurrence of a predetermined unique phase or time differential valve which is present when two different remote video signal sources are broadcasting the same program.

A further object of the present invention is to provide a novel method for controlling the provision of television signals from a plurality of broadcasting stations to a single receiving system such as a community antenna television system wherein a signal is provided only on a priority channel when two stations are broadcasting the same program but the signal is provided from the station which is transmitting the best program signal.

Another object of this invention is to provide an automatic program control apparatus for a cable television system for preventing the distribution of a program signal from one broadcasting station to the subscribers of the cable system when a second broadcasting station is simultaneously transmitting the same program.

These and other objects of the present invention will become readily apparent upon consideration of the following specification and claims in conjunction with the accompanying drawings in which:

Figure 1:
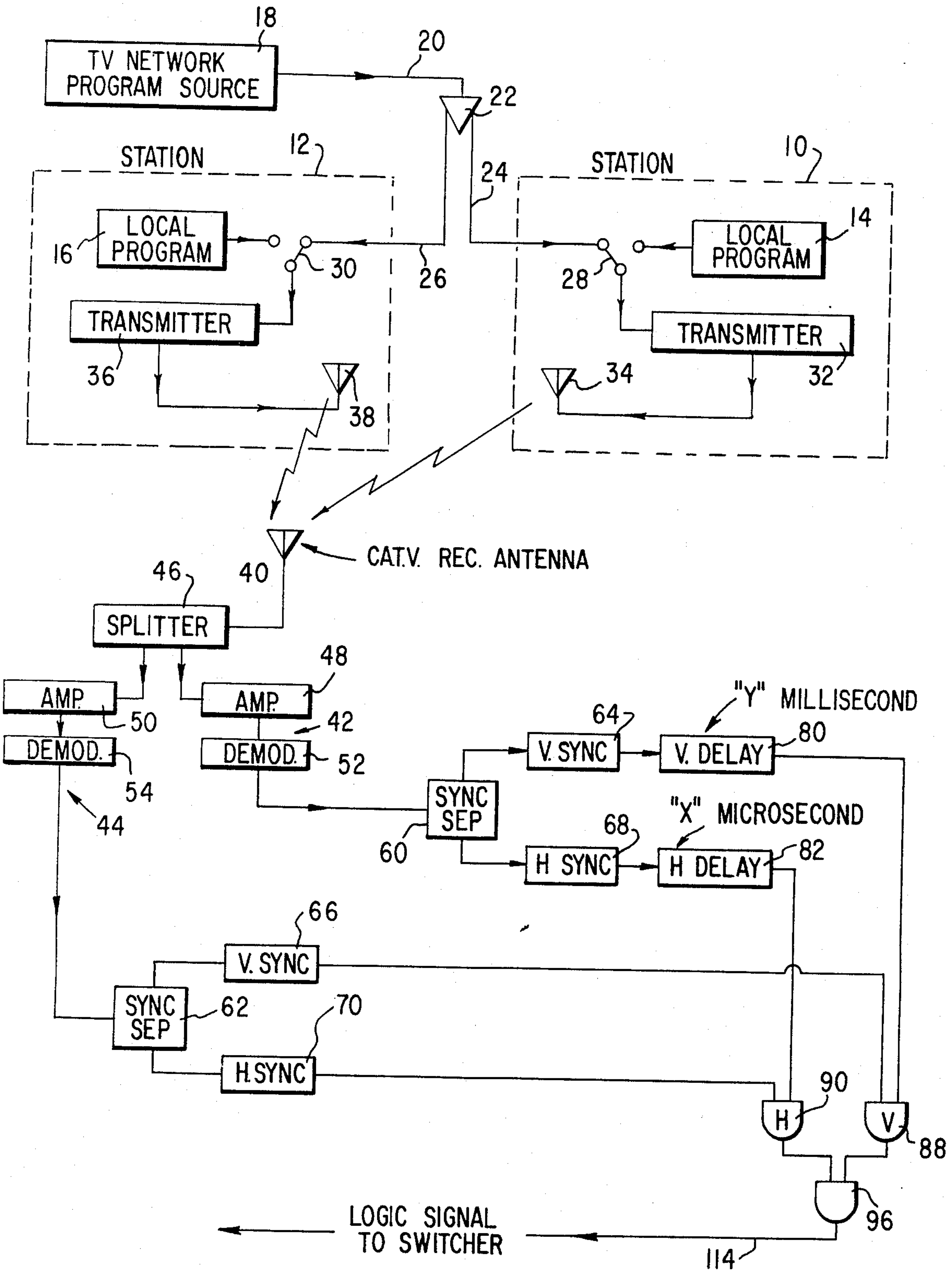
FIG. 1 is a block diagram of a portion of the Automatic Program Control of the present invention operative to provide a control signal when a unique time relationship is detected thereby.

With reference to FIG. 1, the control system of the present invention is responsive to signals from two different television broadcast stations indicated generally as station 10 and station 12. These broadcast stations may provide programs which originate locally at the station from local program sources 14 and 16 respectively, or the programs provided by each station may originate at a central TV network program source 18. The TV network program source, which is normally a television network studio, transmits television program signals by means of a common carrier 20, which may be microwave or similar known transmitting means, to a divider 22 in the distribution network. Here a splitting action occurs, and the program is divided and transmitted over two paths 24 and 26 to the separate broadcasting stations 10 and 12. At each of the broadcasting stations switching means 28 and 30 are provided to determine whether the local program source or the TV network program source will provide the program to be transmitted from a respective broadcasting station. The program from the source selected by the switching means 28 and 30 is then provided to the transmitter for the broadcasting station. The broadcasting station 10 includes a transmitter 32 with a transmitting antenna 34 while the broadcasting station 12 includes a transmitter 36 with a transmitting antenna 38. Thus it is apparent that both the stations 10 and 12 may be broadcasting programs from the respective local program sources 14 and 16, both stations may be broadcasting the same program originating at the TV network program source 18, or one station may be broadcasting a program from the local program source while the remaining station may be broadcasting a program from the TV network program source.

The TV program signal at each broadcast station 10 and 12 which is generated either by the local program sources 14 and 16 or by the TV network program source 18 is provided by the respective switching means 28 and 30 to the transmitters 32 and 36. At the transmitter site, the signal is modulated onto a carrier frequency assigned to that particular broadcasting station in a manner conventional to the art. The signal is then radiated from the station antenna to the headend antenna 40 of a CATV receiving system. It is important to note that the program signals received by the antenna 40 from the broadcasting stations 10 and 12 will experience differing relative time delays. For example, if the broadcasting stations 10 and 12 are both broadcasting a TV program signal originating at the TV program source 18, the length of the distribution paths 24 and 26 from the divider 22 to the respective broadcasting stations 10 and 12 may differ, the type and quantity of terminal signal processing equipment and the particular transmitter utilized by each station 10 and 12 may differ, and the path length from the respective antennas 34 and 38 to the antenna site 40 may differ. All of these factors cause differential delays, and thus the antenna 40 will receive signals from the antennas 34 and 38 at different times, even though these antennas are both transmitting the TV program signals from the central TV program source 18.

Since the long line facilities of the common carrier 20 are dedicated to transmitting the programs of the particular TV network program source 18, the routing of the television signals over this part of the path remains the same over long periods of time. Changes in the routing of the network signals resulting in different time delays can be accommodated by minor adjustment of the CATV switching system equipment covered by this invention as will be hereinafter further developed.

In order to utilize the various time relationships existing between the signals from the broadcasting stations 10 and 12, it is necessary to receive signals from both stations with only sufficient signal-to-noise ratios to permit the extraction of the synchronizing information, since neither the audio or exact picture content are relevant. There is no interference with either the audio or video signals, for only the synchronizing signals, which are normally extracted, are employed to indicate time relationship.

Although in FIG. 1 a common antenna 40 has been disclosed for two receivers, separate antennas may be used if the directions from the CATV headend antenna site containing the antenna 40 to station 10 is sufficiently different from the direction to station 12.

The two CATV receivers served by the antenna 40 are indicated generally at 42 and 44, and each receives the signal provided to the antenna 40 by one of the broadcast stations. When a single antenna 40 is employed, a suitable known splitter 46 is needed to provide the signals from station 10 to receiver 42 and the signals from station 12 to receiver 44. Each receiver consists of components conventional in CATV receivers, and essentially for purposes of this invention, the receivers include amplifiers 48 and 50 connected to receive the program signals from the splitter 46 and demodulators 52 and 54 connected to the respective amplifiers.

The output signals from the demodulators 52 and 54 are essentially the video base band containing the vertical synchronizing pulses at field rate and the horizontal synchronizing pulses at line rate. In accordance with the method of the present invention, these synchronizing pulses with the signals from stations 10 and 12 may be utilized to determine whether both stations are transmitting the same program originating at the same source. When both the stations 10 and 12 are simultaneously transmitting the same program originating from the TV network program source 18, the relative delay between synchronizing pulses from the two stations will be a unique time delay. Conversely, when the stations are transmitting programs from different sources, the time delay differential between both vertical and horizontal synchronizing pulses will be continuously variable rather than the fixed unique time delay which occurs when both broadcasting stations carry the same network signal.

The reliability of this method of recognizing the unique time delays of both horizontal and vertical synchronizing pulses is insured by the rules regulating the apparatus (synch. generator) which is an integral part of every system for converting optical information into a sequential electrical signal. In the majority of operations, these signals are time locked to the color-subcarrier frequency of 3.579545M Hz., with a frequency tolerance of plus or minus 10 Hz. Further, incidental phase modulation or other frequency shifts may not exceed 1/10th Hz. per second.

Since the horizontal synchronizing frequency is 2/455 times the color-subcarrier frequency and the vertical synchronizing frequency in turn is 2/525 times the horizontal frequency, it is clear that using different color-subcarrier sources with small errors in frequency will result in slightly different synchronizing pulse frequencies when different programs are controlled by different sync. generators. For this reason, when station 10 and station 12 are transmitting programs from different sources, the time delay differential between both vertical and horizontal synchronizing signals will be continuously variable rather than the fixed unique time delay value which occurs when both stations carry the same network signal.

Figure 2:
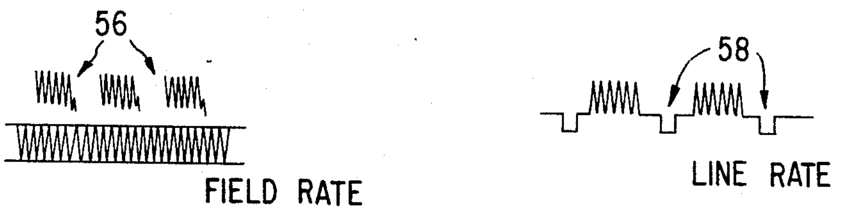
FIG. 2 is a waveform diagram illustrating the signal waveforms from the receivers of FIG. 1.

Referring now to both FIGS. 1 and 2, the synchronizing portion of the television video signal waveform is essentially identical for all television signals transmitted over TV broadcast stations, such stations being subject to adherence to the rules of the government agency (FCC) which regulates broadcasting. The idealized waveform shown in FIG. 2 demonstrates the repetition rate of certain easily identifiable portions of this synchronizing signal. The picture portion of the signal is interrupted at the television field rate (approximately 60 times per second) to permit the transition of the vertical synchronizing signal 56 without showing retrace lines on the home receiver. Similarly, the end of each scan line is terminated by the horizontal blanking pulse, which also carries the horizontal synchronizing pulse 58. The repetition rate of this horizontal synchronizing pulse is approximately 15,750 cycles per second. By means of known circuitry, the horizontal and vertical synchronizing pulses may be extracted and reconstructed in any desired configuration independent of the picture portion of the video signal.

Figure 3:
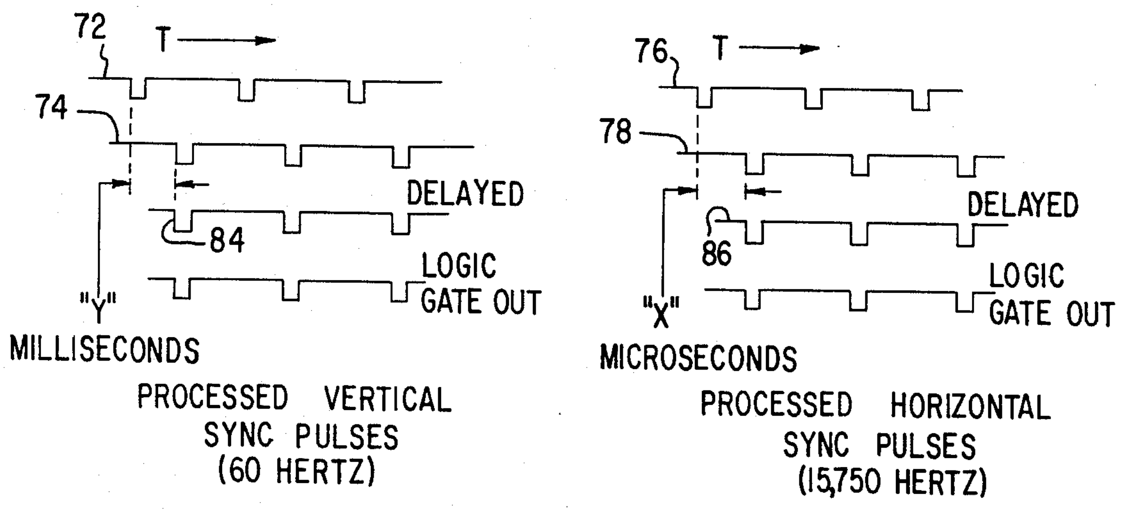
FIG. 3 is a waveform diagram illustrating the signal waveforms from the synchronization signal processors and delay unit of FIG. 1.

The video base band signal (56, 58) containing the vertical and horizontal synchronizing pulses from the demodulators 52 and 54 is directed to sync. separators 60 and 62 which separate the vertical synchronizing pulses from the horizontal synchronizing pulses. these pulses are then reconstructed into pulses with sharply defined rise times using multivibrator circuitry well known to the art. Thus from the sync. separators 60 and 62, the vertical synchronizing pulses are processed and reshaped in multivibration processors 64 and 66 while the horizontal pulses are reshaped in multivibrator processors 68 and 70. As illustrated in FIG. 3, the timing of these reconstructed pulses is a function of the separate paths traversed and the program sources utilized by broadcasting stations 10 and 12. Thus, as will be noted in FIG. 3, the processed vertical synchronizing pulses 72 from the processor 64 are arriving significantly earlier than the processed vertical synchronizing pulses 74 from the processor 66. Similarly, the processed horizontal synchronizing pulses 76 from the processor 68 are arriving significantly earlier than the processed horizontal synchronizing pulses 78 from the processor 70. The signals illustrated are typical of the case where both stations 10 and 12 are simultaneously carrying a program from the same source.

It should also be noted in FIG. 3 that the vertical synchronizing pulses 72 are "Y" milliseconds earlier than those (74) from station 12. The same is true of the horizontal synchronizing pulses wherein the pulses 76 from station 10 are occurring "X" microseconds earlier than thos (78) from station 12. For any single situation involving two TV broadcast stations and a common CATV receiving location, these values of "Y" and "X" are unique when the two RV broadcast stations are simultaneously carrying the same program originating at a common source. Thus, in accordance with the present invention, a field examination would be made to determine the values of "Y" and "X".

Once the unique value of "Y" has been determined, a variable delay unit 80 in the channel receiving the earliest occurring vertical synchronizing pulses is preset to delay these pulses to achieve time coincidence with the vertical pulses from the processor 66. Similarly, a second variable delay unit 82 for the earliest occurring horizontal synchronizing pulses from the processor 68 is preset to achieve time conincidence with the horizontal synchronizing pulses from the processor 70. An accurate presetting of the delay units 80 and 82 may be easily obtained once the unique delay values of "Y" and "X" have been determined. The delay unit 80 is then set to provide a "Y" millisecond delay and the delay unit 82 is preset to provide a "X" microsecond delay. with both delay units so set, the output pulses from the processors 64 and 68 are fed to these delay units and the output from the delay unit 80 is shown at 84 in FIG. 3 while the output pulses from the delay unit 82 are shown at 86. These pulses are now in time coincidence with the corresponding pulses 74 and 78 in the opposite channel.

Figure 4:
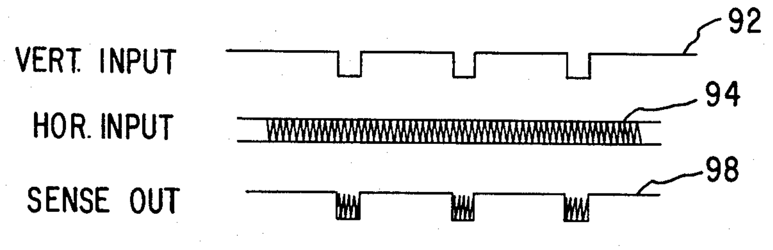
FIG. 4 is a waveform diagram illustrating the input and output waveforms for the sense gate of FIG. 1.

The pulses 84 and 74 from the delay 80 and the processor 66 respectively are fed to the input of a vertical pulse logic gate 88, while the pulses 86 from the delay unit 82 and the pulses 78 from the processor 70 are fed to the input of a horizontal pulse logic gate 90. The horizontal and vertical pulse logic gates are designed in such a manner that simultaneous inputs must be present for the gate to produce an output. With simultaneous inputs, the vertical pulse logic gate 88 provides an output 92 while the horizontal pulse logic gate 90 provides an output 94 (FIG. 4). These outputs are fed to the input of a sense gate 96 which is insensitive to pulse repetition rate or pulse duration. However, the sense gate provides an output 98 (FIG. 4) when the inputs 92 and 94 are simultaneously present at the input to the sense gate. Thus, the sense gate will provide an output only during the time that both stations 10 and 12 are programming from a common source.

By obtaining a delay comparison between both horizontal and vertical synchronizing signals from stations 10 and 12, extraneous switching is avoided which may occur when one vertical signal drifts through the unique delay value determined by network distribution paths. In the delay comparison of two horizontal synchronizing signals, the delay difference may represent more than one television line of approximately 63 microseconds duration, but since each horizontal synchronizing pulse is indistinguishable from any other, delays exceeding one or more television lines are ignored and only the portion less than one television line is recognized.

Figure 5:
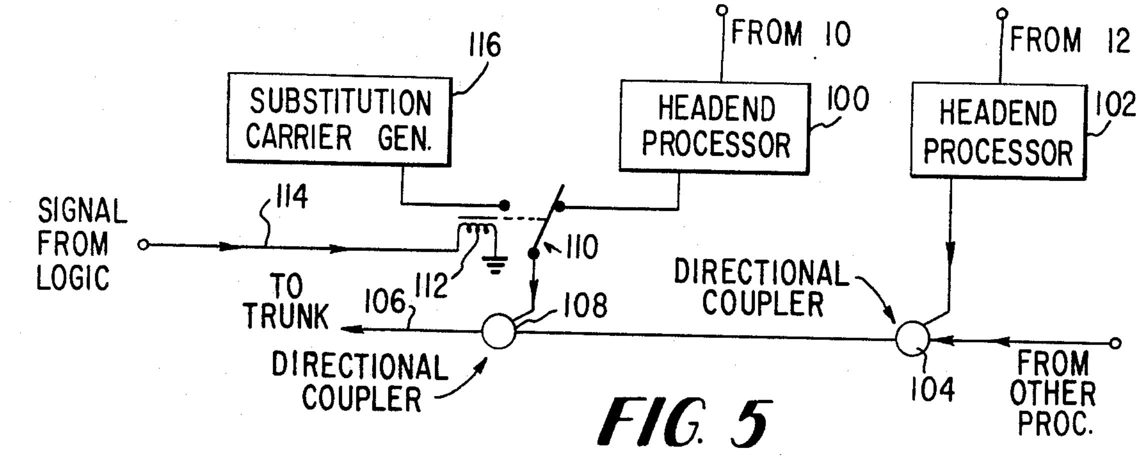
FIG. 5 is a block diagram of a headend switching system used with the present invention.

Referring now to FIG. 5, a block diagram representative of conventional CATV headend equipment is illustrated. The signal from each broadcast station is transmitted over a different frequency channel to a cable, and each channel carried on the CATV system must include some equipment for amplifying only the desired channel passband and combining all outputs on one coaxial cable. Thus, the signal from broadcast station 10 of FIG. 1 is directed from the receiver to a headend processor 100 while the signal from station 12 is directed to a headend processor 102. Assuming that the channel bearing the signal from station 12 is the priority channel, the output from the headend processor 102 for this channel is connected directly to a directional coupler 104 in the common cable 106 while the output from the headend processor 100 is selectively connected to a directional coupler 108 in the combining network through a switching system 110.

The switching system 110 may be any suitable switching system which operates to provide two switching positions in response to an input control signal, but for purposes of illustration, this switching system is shown as a simple relay switching system. The input to a switch operating coil 112 is provided on a line 114 which carries the output signal from the sense gate 96. Obviously, this output signal indicating proper time coincidence may be transformed into various appropriate forms, but for purposes of simplicity in illustrating the application of the invention, it will be assumed that the pulse output from the sense gate has been translated by known pulse to DC translating equipment to a DC voltage for operation of the relay switch 110. This relay switch is a normally open switch, and, therefore, in the absence of a signal on the line 114, the output from the headend processor 100 is connected directly to the directional coupler 108. However, when an output signal from the sense gate 96 is present on the line 114 indicating that both channels are carrying the same program from the same program source, the relay coil 112 is energized to cause the switching system 110 to disconnect the headend processor 100 from the directional coupler 108. The switching system then connects a substitution carrier generator 116 to the directional coupler 108 to provide a signal of appropriate carrier frequency in place of the signal from the headend processor 100. On many state of the art CATV headend processor units, the substitution carrier generator may be an integral part of the processor.

Figure 6:
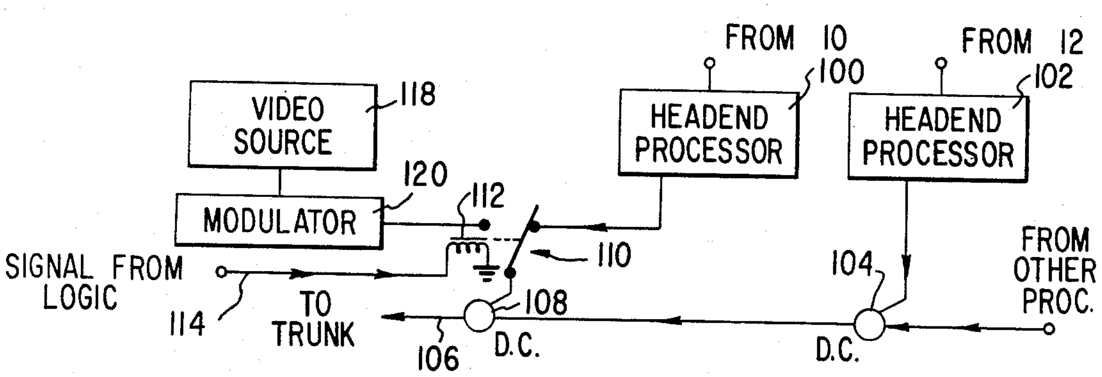
FIG. 6 is a block diagram of a second embodiment of a headend switching system used with the present invention.

In some systems more advanced in sophistication than the system of FIG. 5, it may be desirable to display a visual message on the distant channel served by headend processor 100 to indicate that the program on this channel is being deleted pursuant to government regulations and may be seen on the priority channel. To accomplish this, a simple vidicon camera 118 feeding a modulator 120 may be employed as a replacement for the substitution carrier generator 116 of FIG. 5. This arrangement is illustrated in FIG. 6, wherein the combination camera and modulator provide a signal to the directional coupler 108 resulting in a video message on the nonpriority channel. This video message would inform a viewer to switch to the priority channel served by headend processor 102. Obviously, a taped program could also be supplied on the nonpriority channel.

Occasionally, the quality of the network signal received through the priority channel is technically inferior to the signal received on the nonpriority channel. In this case, it may be desired to use the signal from station 10 in lieu of the inferior signal from station 12. This may be accomplished employing the modified equipment of FIG. 7.

Substantially all presently manufactured headend processors (100, 102) employ the hetrodyne principal in amplifying and maintaining constant signal levels for distribution. The processor for distant station 10 is assumed to be of this type, and provides a conversion to an intermediate frequency by means of a down converter forming the headend processor 100. Similarly, the signal from the local station 12 is processed to an intermediate frequency band by a down converter forming the headend processor 102. Thus, the output signal from both of the headend processors in FIG. 7 is an intermediate frequency output.

The output signal from the processor 102 is directed to a switching system 122 which is similar to the switching system 110. Like the switching system 110, the switching system 122 may consist of any suitable signal controlled switching system, and for purposes of simplicity, this system is disclosed as a relay operated switching system. The switching system 122 includes a relay coil 124 which is connected to the line 114 and is operated by the signal on this line in the same manner as the switching system 110.

The output from the switching system 110 is directed to an up converter 126 while the output from the switching system 122 is directed to a similar up converter 128. The signals from the up converters 126 and 128 are then directed to the directional couplers 108 and 104 respectively. Also, it will be noted in FIG. 7 that the substitution carrier generator 116 constitutes an IF modulated carrier generator.

Figure 7:
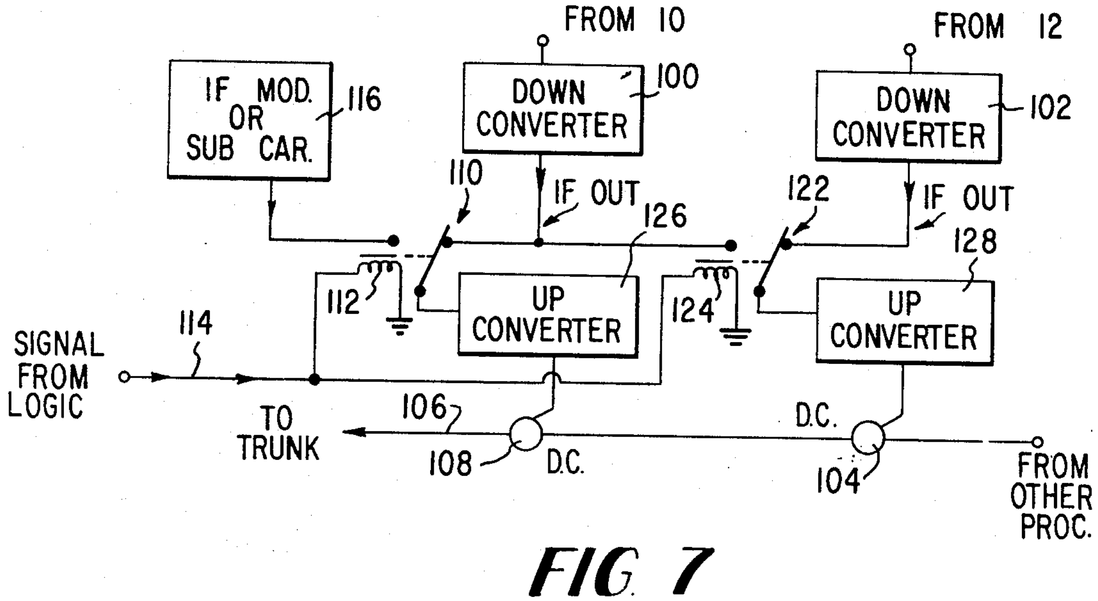
FIG. 7 is a block diagram of a third embodiment of a headend switching system used with the present invention.

When the signal from station 10 is to be removed from the normal CATV channel by the sensing gate signal on the line 114 in the manner previously described, both the switching units 110 and 122 are activated to switch from the normal position illustrated in FIG. 7. Now, the intermediate frequency signal from the processor 100 is applied through the switch of 122 and the up converter 128 to the directional coupler 104 to replace the signal from the station 112. Transmission still occurs on the priority channel but with the program signal from station 10.

During network programming periods, local stations are frequently provided time for locally originated commercial material known as "cut-ins". In order to avoid the cut-ins from station 10 being transmitted on the cable channel used by station 12, the relay switch 122 must operate with a reasonable speed.

In some cases, it might be desirable to operate the switching system 122 by means other than the signal on the line 114. For example, this switching system could be operated by a system responsive to a weak or distorted signal from the processor 102, or the relay switch could be replaced by a manually operated switch.

It will be readily apparent to those skilled in the art that the present invention provides a novel and accurate method for determining if two broadcasting stations are transmitting the same television program. By eliminating the necessity to achieve an actual comparison between either the video or audio signals which constitute the operative components of the television signal from these stations, the difficulties and inaccuracies attendant with such signal comparisons are eliminated. No interference with the video or audio signals results, and no actual signal comparison occurs. Instead, the synchronizing signals which are conventionally transmitted along with the television-signal and are separated from the television signal are employed to indicate when the two different video signal sources have the predetermined unique precise phase or time differential indicative of simultaneous transmission of the same program. It is the occurrence of this unique time differential value which results in the controlled switching performed by the apparatus of this invention.

I claim:

1. A method for controlling the distribution of signals for a cable television system which receives television signals from at least two signal sources wherein the signals from said respective sources received by the cable television system have a unique relative time differential only when the signal sources are simultaneously transmitting the same program which includes, sensing the presence of said unique relative time differential and preventing the distribution to the cable television system of signals from one of said signal sources when the presence of said unique time differential is sensed.

2. The method of claim 1 which includes normally distributing the television signals from a first of said signal sources on a first channel for said cable television system and the television signals from a second of said signal sources on a second channel for said cable television system and preventing the distribution of television signals from said first source on said first channel when the presence of said unique time differential is sensed to indicate that said first and second sources are simultaneously transmitting the same program.

3. The method of claim 2 which includes preventing the distribution of the television signal from said second signal source on said second channel and distributing the television signal from said first signal source on said second channel when the presence of said unique time differential is sensed.

4. The method of claim 1 which includes separating synchronizing pulses transmitted with the television signals received from said two signal sources, delaying the synchronizing pulses from the earliest received television signal from a first of said signal sources for a time equal to said unique time differential, and preventing the distribution to the cable television system of signals from one of said signal sources when the synchronizing pulses from the remaining signal source are in time coincidence with the delayed synchronizing pulses.

5. The method of claim 4 which includes separating both horizontal and vertical synchronizing pulses transmitted with the television signals received from said two signal sources, delaying both the horizontal and vertical synchronizing pulses from the earliest received television signal from a first of said signal sources for a time equal to said unique time differential, and preventing the distribution to the cable television system of signals from one of said signal sources when the horizontal synchronizing pulses and vertical synchronizing pulses from the remaining signal source are simultaneously in time coincidence with the delayed synchronizing pulses.

6. The method of claim 5 which includes preventing the distribution to the cable television system of signals from one of said signal sources when the horizontal and vertical synchronizing pulses from the remaining signal source are in time and frequency coincidence with the delayed synchronizing pulses.

7. A method for controlling the distribution of signals for a cable television system which receives television signals from at least a first and a second signal source which includes normally distributing the television signals from said first signal source on a first channel for said cable television system, normally distributing the television signals from said second signal source on a second channel for said cable television system, determining when said first and second signal sources are simultaneously transmitting the same program, preventing the distribution of television signals from said first signal source on said first channel when said first and second signal sources are transmitting the same program, determining which of said first and second signal sources is transmitting a signal of a quality superior to the signal from the remaining signal source, preventing the distribution of the signal from said second signal source on said second channel when the signal from said first signal source is of superior quality, and distributing the signal from said first signal source on said second channel.

8. An automatic control unit for controlling the distribution of signals for a cable television system which receives television signals from at least two signal sources wherein the signals from said respective sources received by the cable television system have a unique relative time differential only when the signal sources are simultaneously transmitting the same program comprising first signal means to receive signals transmitted by a first of said signal sources which are first received by said cable television system, second signal means to receive signals transmitted by a second of said signal sources, delay means connected to receive signals from said first signal means and to delay said signals for a time equal to said unique time differential, and gate means connected to receive the delayed signals from said delay means and signals from said second signal means, said gate means operating to provide an output signal upon the simultaneous reception thereby of coincident input signals from said delay means and second signal means.

9. The automatic control unit of claim 8 which includes switching means operative upon receipt of the output signal from said gate means for preventing the distribution of television signals received from one of said signal sources to said cable television system.

10. An automatic control unit for controlling the distribution of signals for a cable television system which receives signals from at least two signal sources to prevent a first channel of said television system which normally carries a program transmitted by a first of said signal sources from simultaneously carrying the same program as a second channel of said television system which normally carries a program transmitted by a second of said signal sources when said first and second signal sources are simultaneously transmitting the same program comprising first signal means connected to receive signals transmitted by said first signal source, second signal means connected to receive signals from said second signal source, delay means connected to receive signals from said first signal means, said delay means operating to delay the signals from said first signal means for a time sufficient to make said delayed signals coincident with signals from said second signal means when said first and second signal sources are simultaneously transmitting the same program, and switching means connected to receive the delayed signals from said delay means and the signals from said second signal means, said switching means operating upon receipt thereby of delayed signals coincident with the signals from said second signal means to prevent the distribution of television signals received from one of said signal sources to said cable television system.

11. The automatic control unit of claim 10 wherein said switching means includes gate means connected to receive the delayed signals from said delay means and the signals from said second signal means, said gate means operating to provide an output switching control signal upon the simultaneous reception thereby of coincident input signals from said delay means and second signal means, and signal operated switch means normally operative to connect the signal received from said second signal source by said cable television system for transmission on the second channel of said cable television system, said signal operated switch means being connected to receive said output switching control signal and being responsive thereto to prevent transmission of the signal received from said second signal source on the second channel.

12. The automatic control unit of claim 11 wherein said switching means includes second switch means normally operative to connect the signal received from said first signal source by said cable television system for transmission on first channel of said cable television system, said signal operated switch means operating upon receipt of said output switching control signal to connect the signal received from said second signal source to said second switch means, said second switch means being operable to prevent transmission of the signal received from said first signal source on said first channel while connecting the signal from said second signal source for transmission on said first channel when said first and second signal sources are transmitting the same program.

13. The automatic control unit of claim 12 wherein said second switch means is connected to receive the output switching control signal and is operative upon receipt thereof to prevent transmission of the signal received from said first signal source on said first channel while connecting the signal from said second signal source for transmission on said first channel.

14. The automatic control unit of claim 10 wherein said first and second signal means provide output signals consisting of synchronizing signals transmitted by said first and second signal sources respectively.

15. The automatic control unit of claim 14 wherein said first and second signal means provide output signals consisting of horizontal synchronizing pulses and vertical synchronizing pulses, said delay means including a vertical signal delay means connected to delay the vertical synchronizing pulses from said first signal means for a time sufficient to make said delayed vertical synchronizing pulses coincident with the vertical synchronizing pulses from said second signal means when said first and second signal sources are simultaneously transmitting the same program and a horizontal signal delay means connected to delay the horizontal synchronizing pulses from said first signal means for a time sufficient to make said delayed horizontal synchronizing pulses coincident with the horizontal synchronizing pulses from said second signal means when said first and second signal sources are simultaneously transmitting the same program.

16. The automatic control unit of claim 15 wherein said switching means includes horizontal logic gate means connected to receive said delayed horizontal synchronizing pulses and the horizontal synchronizing pulses from said second signal means, said horizontal logic gate means operating to provide a horizontal logic output signal when coincident horizontal synchronizing pulses are simultaneously received thereby from said horizontal signal delay means and said second signal means, vertical logic gate means connected to receive said delayed vertical synchronizing pulses and the vertical synchronizing pulses from said second signal means, said vertical logic gate means operating to provide a vertical logic output signal when coincident vertical synchronizing pulses are simultaneously received thereby from said vertical signal delay means and said second signal means, and sense gate means connected to receive said horizontal and vertical logic output signals, said sense gate means operating to provide an output switching control signal when said horizontal and vertical logic output signals are simultaneously received thereby.

17. The automatic control unit of claim 16 wherein said switching means includes signal operated switch means normally operative to connect the signal received from said second signal source by said cable television system for transmission on the second channel of said cable television system, said signal operated switch means being connected to receive said output switching control signal and being responsive thereto to prevent transmission of the signal received from said second signal source on the second channel.

18. The automatic control unit of claim 17 wherein said switching means includes second switch means normally operative to connect the signal received from said first signal source by said cable television system for transmission on said first channel of said cable television system, said signal operated switch means operating upon receipt of said output switching control signal to connect the signal received from said second signal source to said second switch means, said second switch means being operable to prevent transmission of the signal received from said first signal source on said first channel while connecting the signal from said second signal source for tranmission on said first channel when said first and second signal sources are transmitting the same program.

19. The automatic control unit of claim 18 wherein said second switch means is connected to receive the output switching control signal and is operative upon receipt thereof to prevent transmission of the signal received from said first signal source on said first channel while connecting the signal from said second signal source for transmission on said first channel.

* * * * *